June 15, 1926.　　　　　　　　　　　　　　　1,589,177
D. S. KENDALL
COMPOSITE SPOOL AND LIKE ARTICLE AND PROCESS OF PRODUCING THEM
Filed March 27, 1924
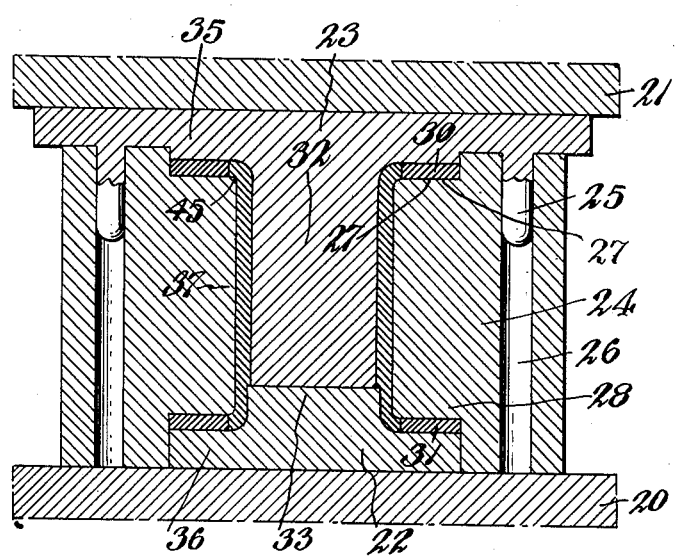
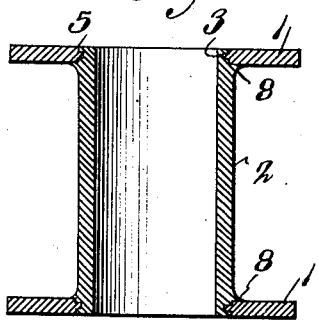
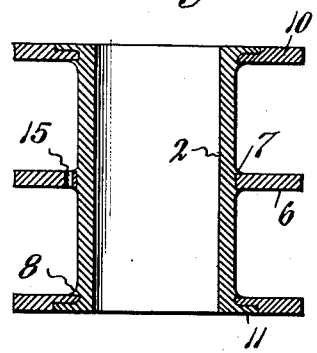
Inventor:
D. S. Kendall
Meyers & Cavanagh
Attorneys Patented June 15, 1926.

1,589,177

UNITED STATES PATENT OFFICE.

DONALD S. KENDALL, OF LITTLE FALLS, NEW JERSEY, ASSIGNOR TO MACK MOLDING COMPANY, INC., OF LITTLE FALLS, NEW JERSEY, A CORPORATION OF NEW JERSEY.

COMPOSITE SPOOL AND LIKE ARTICLE AND PROCESS OF PRODUCING THEM.

Application filed March 27, 1924. Serial No. 702,244.

This invention relates to spools and other more or less similar articles of composite structure, and methods by which they are produced.

Spools used for winding wire for shipment or vending, or for use as magnet coils and otherwise in the electrical arts, are a sufficient example of the utility of the invention, which is therefore herein described as relating to such spools and the methods of their manufacture.

Spools for the stated purposes have heretofore been made of cementitious material and especially the class of such materials known as synthetic resins, including the broad class of phenolic condensation products, known by various familiar trade names, and have usually been molded as a substantially unitary or homogeneous structure composed of such materials, or of a filler impregnated with the cementitious material. While such articles are in general satisfactory for the purposes in view, they have the disadvantage of being more or less brittle and breakable, and this is especially true of the end discs or flanges of the spools, which are frequently broken, for example, when the spools are dropped upon the floor or struck with a hard object such as a tool. The structures composed entirely of the cementitious or synthetic resinous materials are also unduly expensive in some cases.

To avoid the stated and other objections and disadvantages, the present invention provides, as broadly stated, for utilizing various materials other than cementitious materials of the character above stated for certain parts of the spool structure, and especially for the end discs or flanges, and in some cases for intermediate discs or flanges when such are provided, in connection with a central or body structure which is usually of tubular form and composed of cementitious material, such as a synthetic resin, or more particularly a phenolic condensation product, suitably united to the discs or flanges in the process of manufacture, which also forms a part of the invention. As a sufficient preliminary example of a particular structure and method, it is sufficient to say that in a particular case the spool may consist of discs or flanges of any of a variety of materials well exemplified by the name "fibre", or they may be a laminated structure in which the laminations are held together by cementitious material which may be the classes above referred to, or may be other suitable cementitious material. The tubular body or "sleeve" is composed of a cementitious material of the classes above identified, and is united with the discs or flanges by a molding operation, so that the parts of the composite structure are tightly joined and the spool is in functional respects substantially a unitary structure, but with the advantages of economy in material and cost of manufacture, and substantial or complete freedom from fracture, since the discs or flanges are of relatively tough or non-frangible material, practically proof against cracking or breaking, even when the spools are dropped or struck with hard objects. The spool bodies may be of substantially pure or "solid" cementitious materials of the classes identified, or may be of the filler type, that is to say, they may consist of a suitable filler such as wood pulp or fibre impregnated with the cementitious material and molded to proper form and in contact with the discs or flanges, and heat-treated to harden or "set" it.

The accompanying drawings sufficiently show representative structures and process operations for carrying out the invention in practical ways. After considering these examples, skilled persons will understand that many variations may be made, and I contemplate the employment of any structures and processes or methods, that are properly within the scope of the appended claims.

Fig. 1 is a section of a suitable press or mold adapted for producing spools which embody the invention in one form, in accordance with a method which is also one exemplification of the invention.

Fig. 2 is a longitudinal section of a modified spool embodying the invention.

Fig. 3 is a similar view of another type or modified form of spool.

Fig. 4 is an end view of the same, with a portion broken away for space economy in the drawing.

Fig. 2 shows a spool adapted for the purposes above stated, or for other purposes, and consisting of originally-separate end discs or flanges 1 and a body 2. The end discs or flanges may be of any of that class of materials generally known as "fibre," or they may be laminated structures in which the laminations are of paper or fabric united by cementitious material, and molded or pressed and heat treated, and cut to proper shape if they are not shaped in the molding process. In the present instance the aperture of each disc is finished with a shallow annular rib 3. The spool body or sleeve 2 consists of a suitable cementitious material, usually a synthetic resin product. The tube may be of a pure synthetic resin or it may consist of a suitable filler mixed or impregnated with the resin. The tube is molded and heat treated as well understood in the art of handling synthetic resins, in contact with the end discs, and when so molded and discharged from the mold, the end portions of the tube are in firm and permanent contact with the discs at their apertures, and in the present specific example, portions 4 and 5 and the tube perimeter are interlocked with the shallow disc ribs 3, so that dislocation of the discs is impossible without destruction of the spool. In some cases the ribs 3 or any equivalent thereof may be dispensed with.

Figure 3 sufficiently explains some of the many possible modifications. In addition to the end discs the central or any other intermediate disc or discs 6 may be provided. This intermediate disc or flange is united with the tube 2 in the molding process and the molds are usually so constructed that fillets 7 are formed in the resinous material adjacent the inward margins of the flange, and so that shallow flanges or beads of the cementitious material overlie such margins to positively lock the flange or disc against end movement. Similarly in the formation of all of the spools, fillets are desirably formed in the cementitious material where it joins the inward surfaces of any of the flanges, as, for example at 8, Figs. 2 and 3.

The end discs or flanges 10 in Fig. 3, are countersunk about their apertures at their outer surfaces, forming pockets in which flange-like portions 11 of the cementitious material flow in the molding operation, to more securely lock the end discs in position, and particularly to secure them against outward displacement.

When it is desired to provide a passageway between the spool spaces formed by different discs or flanges, for example, to permit a wire to be passed through an intermediate flange, this may be done by providing an aperture in such intermediate flange as sufficiently represented at 15, Fig. 3. The aperture is usually located slightly outwardly from the periphery of the central disc aperture, so that it will not become clogged with the cementitious material when the sleeve is molded.

Evidently many other structural modifications may be made within the scope of the invention.

In any of these structures it is evident that while they are made of originally-separate parts for reasons above given, upon completion they are to all intents and purposes unitary and homogeneous and they are, moreover, very finely and smoothly finished, usually without any necessity for a finishing treatment after they come from the molds.

The process forming a part of the invention is sufficiently explained in one exemplifying form by reference to Fig. 1. A mold structure is provided comprising a base plate 20, a top or cope plate 21, a lower core piece 22 resting on or secured to the base plate, an upper core piece 23 secured to or acted upon by the cope plate 21, and a main mold body 24, consisting of laterally-separable parts (not shown). The upper core piece has dowel pins 25 entering holes 26 in the mold body to properly register the upper core. The upper and lower ends of the mold body are countersunk to provide seats or sockets 27 and 28 for spool flanges 30 and 31. The upper core piece has a plunger portion 32 to form the interior bore of the sleeve and the lower core piece has a co-operating short plunger portion 33, the faces of these portions being arranged to meet at the end of the pressing movement. The diameter of plunger portion 33 may be in some cases slightly greater than that of plunger 32. Upper core piece 32 also has a shallow cylindrical portion 35 adapted to enter the upper countersink of the mold body, and the lower core piece has a similar cylindrical portion 36 to enter the lower countersink of the mold body. The central bore 37 of the body is arranged to form the outer cylindrical or otherwise contoured shape of the spool sleeve 40.

When the mold parts are separated one of the end discs 31 is first put in position on core piece 22; the mold body is then put in place, whereupon the lower disc is properly held in position, and the upper end flange or disc 30 is put in place on the mold body. The mold is then charged with a measured quantity of the cementitious material 40, and the upper core piece is moved down into the mold with suitable pressure, whereupon the cementitious material is pressed in shape to form the spool sleeve and is also pressed in engagement with the surfaces of the end disc apertures with powerful pressure, and when heat is applied, as well understood in this art, the cementitious material is solidified or "set", and the spool structure is made substantially unitary, as previously explained.

Suitable fillets are provided as at 45 and 46.

The spool shown in this figure is an example of a spool structure in which no special or irregular formation of the disc apertures is necessary for a proper union with the cementitious sleeve.

The completed article is discharged from the mold in an obvious way.

Evidently the process steps, as well as the structure, may be considerably varied within the principles of the invention.

I claim:

1. A composite spool or similar article comprising a sleeve portion of cementitious material of the character described and an originally separate flange member of relatively non-frangible material firmly connected with said sleeve portion.

2. A composite spool or similar article comprising a sleeve portion of synthetic resinous material, and an originally separate flange member of relatively non-frangible material firmly connected with said sleeve portion.

3. A composite spool or similar article comprising a sleeve portion of cementitious material of the character described, and an originally separate flange member of different relatively non-frangible material, said sleeve portion being molded in union with said flange member.

4. A composite spool or similar article comprising a sleeve portion of phenolic condensation material, and an originally separate flange member of relatively non-frangible material, said sleeve portion being molded in union with said flange member.

5. A spool or similar article comprising a sleeve member of synthetic resinous composition and an originally separate flange member of different relatively non-frangible material having an aperture receiving said sleeve member, the latter being molded in permanent engagement with said flange aperture to form a substantially unitary structure.

6. A spool or similar structure comprising a sleeve portion of synthetic resinous material, and originally separate flange members of different relatively non-frangible material having apertures to receive said sleeve, the latter being molded in firm and permanent contact with the flange apertures to form a substantially unitary structure.

7. A spool or similar article comprising a sleeve member of synthetic resinous composition, and an originally separate flange member of different relatively non-frangible material having an aperture receiving said sleeve member, the latter being molded in permanent engagement with said flange aperture to form a substantially uniform structure, said flange and sleeve being formed with interlocking formations.

8. A spool or similar structure comprising a sleeve portion of synthetic resinous material, and originally separate flange members of different relatively non-frangible material having apertures to receive said sleeve, the latter being molded in firm and permanent contact with the flange apertures to form a substantially unitary structure, said flanges and sleeve being formed with interlocking formations.

9. A process of producing composite spools and similar articles, comprising pressing and solidifying cementitious material of the character described in sleeve form in contact with originally separate flange members to form a substantially unitary article.

10. A process of producing composite spools and similar articles, comprising pressing and solidifying synthetic resinous material in sleeve form in contact with originally separate pre-formed flange members to form a substantially unitary article.

11. A process of producing composite spools and similar articles, comprising pressing and solidifying phenolic condensate in sleeve form in contact with originally separate pre-formed flange members to form a substantially unitary article.

12. A process of producing composite spools and similar articles, comprising molding cementitious material under pressure in contact with the apertures of a pre-formed flange member.

13. A process of producing composite spools and similar articles, comprising molding cementitious material under pressure in contact with the apertures of a pre-formed flange member, and solidifying the cementitious material by heat to form a unitary structure.

14. A process of producing composite spools and similar articles, comprising molding phenolic condensate under heavy pressure in contact with the apertures of spaced pre-formed flange members, and solidifying the phenolic condensate by heat to form a unitary structure.

15. A process of producing composite spools and similar articles comprising molding a phenolic condensation product under pressure in contact with the aperture of a flange member, and solidifying the condensation material by heat to form a unitary structure.

16. A process of producing composite spools and similar articles, comprising arranging flange members for a spool or similar structure in spaced relation in a mold, inserting a charge of cementitious material, and molding said material under pressure in contact with portions of the flanges adjacent apertures therein to form a permanent and unitary structure.

17. A process of producing composite spools and similar articles, comprising arranging flange members for a spool or similar structure in spaced relation in a mold, inserting a charge of cementitious material, and molding said material under pressure in contact with portions of the flanges adjacent apertures therein, and heating the cementitious material while under pressure.

18. A process of producing composite spools and similar articles, comprising arranging flange members for a spool or similar structure in spaced relation in a mold, inserting a charge of synthetic resinous composition, and molding said composition under heavy pressure in contact with portions of the flanges adjacent apertures therein to form a permanent and unitary structure.

19. A process of producing composite spools and similar articles, comprising arranging flange members for a spool or similar structure in spaced relation in a mold, inserting a charge of synthetic resinous composition, and molding said composition under heavy pressure in contact with portions of the flanges adjacent apertures therein, and heating the resinous material while under pressure.

20. A process of producing composite spools and similar articles, comprising arranging flange members for a spool or similar structure in spaced relation in a mold, inserting a charge of a phenolic condensation product, and molding said product under heavy pressure in contact with portions of the flanges adjacent apertures therein to form a permanent and unitary structure.

21. A process of producing composite spools and similar articles, comprising arranging flange members for a spool or similar structure in spaced relation in a mold, inserting a charge of a phenolic condensation product, and molding said product under heavy pressure in contact with portions of the flanges adjacent apertures therein, and heating the phenolic product while under pressure.

Signed at New York, in the county of New York and State of New York, this 3rd day of March A. D. 1924.

DONALD S. KENDALL.